United States Patent [19]
Kawahara

[11] Patent Number: 5,489,942
[45] Date of Patent: Feb. 6, 1996

[54] IMAGE COMPRESSING APPARATUS

[75] Inventor: Kenji Kawahara, Nara, Japan

[73] Assignee: Sharp Kabushiki Kaisha, Osaka, Japan

[21] Appl. No.: 215,411

[22] Filed: Mar. 21, 1994

[30] Foreign Application Priority Data

Jun. 18, 1993 [JP] Japan ................................. 5-147718

[51] Int. Cl.$^6$ ................................................. H04N 7/50
[52] U.S. Cl. ................................. 348/401; 348/415
[58] Field of Search ................................. 348/405, 419, 348/401, 415; H04N 7/133, 7/137, 7/50

[56] References Cited

U.S. PATENT DOCUMENTS 4,488,174 12/1984 Mitchell .................................. 348/415

FOREIGN PATENT DOCUMENTS 4196681 7/1992 Japan .

OTHER PUBLICATIONS

Peter A. Ruetz et al., "A High–Performance Full–Motion Video Compression Chip Set", IEEE Transactions on Circuit and Systems for Video Technology, pp. 111–122, Jun. 1992.
Fujiwara et al., "An All–ASIC Implementation of a Low Bit–Rate Video Codec", IEEE Transactions on Circuit and Systems for Video Technology, pp. 123–133, Jun. 1992.
Yamauchi et al., "Architecture and Implementation of a Highly Parallel Single–Chip Video DSP", IEEE Transactions on Circuit and Systems for Video Technology, pp. 207–220, Jun. 1992.
Yoshimura et al., "A Single Board Video CODEC", NTT R&D No. 8 pp. 1025–1042, 1991.
Hiroshi Yasuda, "International Standards for Multi Coding", Maruzen, pp. 14–18, 84–96 and 125–138.

*Primary Examiner*—Howard W. Britton

[57] ABSTRACT

An image compressing apparatus has a predictive coding unit, an orthogonal transform unit, a quantization unit, a variable length coding unit, a coding control unit and a start decision unit. The start decision unit receives predictive errors from the predictive coding unit and a quantization parameter from the coding control unit to produce a start control signal. The start control signal is set to a logic value 1 if the orthogonal transform unit, the quantization unit and the variable length coding unit are to be activated, and to a logic value 0 if they are not to be activated. The orthogonal transform unit, the quantization unit and the variable length coding unit are activated with the logic value 1 to perform respective processes, and are kept unactivated with the logic value 0. The image compressing apparatus is low in power dissipation and short in processing time.

13 Claims, 10 Drawing Sheets

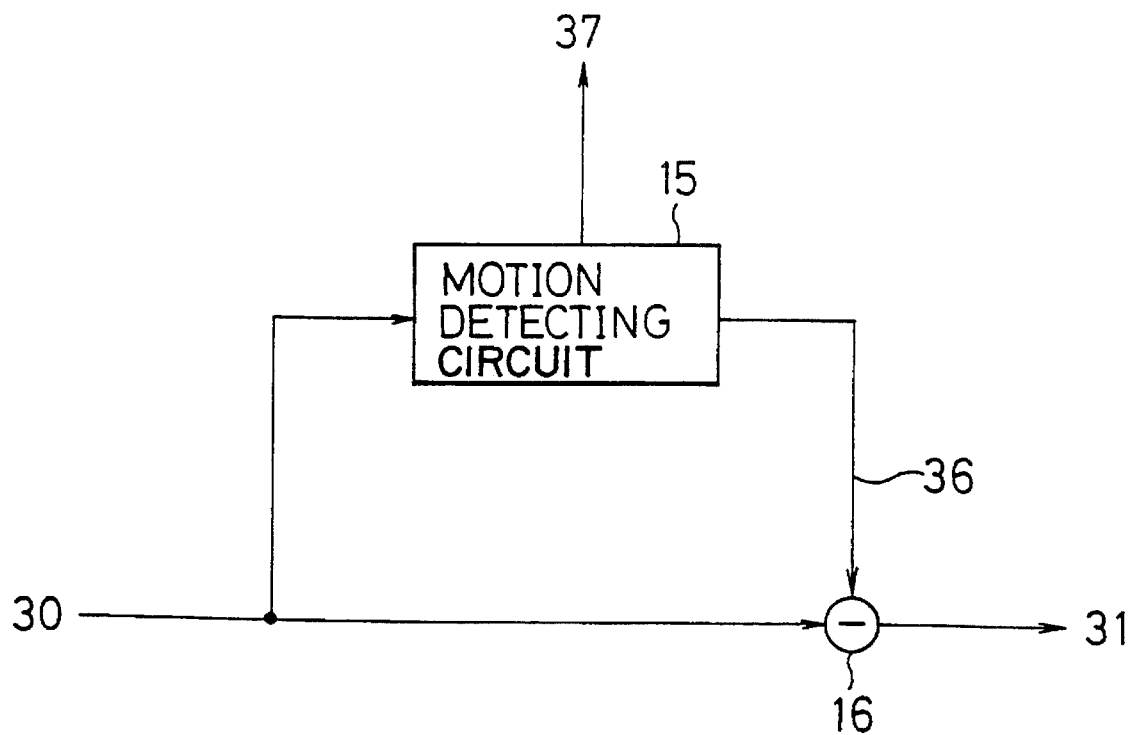

Fig. 6

| QUANTIZING PARAMETER Q | THRESHOLD VALUE T |
|---|---|
| 1 | 8 |
| 2 | 12 |
| 3 | 24 |
| 4 | 28 |
| 5 | 40 |
| 6 | 44 |
| 7 | 56 |
| ⋮ | ⋮ |

Fig. 7

| QUANTIZING PARAMETER Q | THRESHOLD VALUE T |
|---|---|
| 1 | 12 |
| 2 | 16 |
| 3 | 28 |
| 4 | 32 |
| 5 | 44 |
| 6 | 48 |
| 7 | 60 |
| ⋮ | ⋮ |

Fig. 10

| QUANTIZING PARAMETER Q | THRESHOLD VALUE T |
|---|---|
| 1 | 8 |
| 2 | 12 |
| 3 | 24 |
| 4 | 28 |
| 5 | 40 |
| 6 | 44 |
| 7 | 56 |
| ⋮ | ⋮ |

Fig. 11

| QUANTIZING PARAMETER Q | THRESHOLD VALUE T |
|---|---|
| 1 | 32 |
| 2 | 48 |
| 3 | 96 |
| 4 | 112 |
| 5 | 160 |
| 6 | 176 |
| 7 | 224 |
| ⋮ | ⋮ |

IMAGE COMPRESSING APPARATUS

BACKGROUND OF THE INVENTION

1. Field of the Invention

The present invention relates to an image compressing apparatus in the image processing technology.

2. Related Background Art

There are some international standards defined for compression method of moving image, for example, H. 261 for video phone or video conference system by CCITT (International Telegraph and Telephone Consultative Committee) and MPEG for storage media by ISO (International Organization for Standardization). These international standards employ common techniques of interframe predictive coding with motion detection, orthogonal transform, quantization and variable length coding. The summary of these international standards is described for example in "international standards for multi media coding" (Maruzen, June 1991) edited by Hiroshi, YASUDA.

FIG. 13 shows a conventional image compressing apparatus in conformity with the above international standards. The image compressing apparatus in FIG. 13 is composed of a predictive coding unit 10 for producing prediction errors 31 for each block and a prediction error sum 37 for each macroblock; an orthogonal transform unit 11 for effecting an orthogonal transform on each predictive error 31 to produce an orthogonal transform result 32; a quantization unit 12 for quantizing each orthogonal transform result 32 to produce a quantizing result 33; a variable length coding unit 13 for variable-length-coding each quantizing result 33; and a coding control unit 14 for producing a quantization parameter 35. In the following description, video input signals 30 are represented by Aij, the predictive errors 31 by Bij, the orthogonal transform results 32 by Cij, the quantizing results 33 by Dij, and the quantization parameter 35 by Q.

The image compressing apparatus divides an image frame into processing units called macroblocks, and effects the same processing on each macroblock. FIGS. 2a to 2c are drawings to show the constitution of a macroblock. FIG. 2a shows a luminance signal Y, FIG. 2b a chrominance signal $C_B$, and FIG. 2c a chrominance signal $C_R$, which indicates that a macroblock is composed of a luminance signal of 16×16 pixels and two types of chrominance signals of 8×8 pixels. In the drawings, a circle represents a pixel. Also, a macroblock is further divided into blocks, each with 8×8 pixels as shown in FIGS. 2a to 2c. Each block is a minimum unit for processing. Therefore, a macroblock is composed of four blocks of luminance signals and two blocks of chrominance signals. The image compressing apparatus compresses an image by consecutively performing the processes of predictive coding, orthogonal transform, quantization and variable length coding in the unit of a macroblock or block.

In the conventional image compressing apparatus as shown in FIG. 18 and described above, the orthogonal transform unit, the quantization unit and the variable length coding unit are activated to operate for all blocks irrespective of the characteristics of predictive error.

LSI Logic Inc. and Graphics Communication Technology Inc. each independently presented an LSI chip set for image compression in conformity with H. 261 in IEEE Transactions on Circuits and Systems for Video Technology (pp. 111–133, June 1992), for example. Their presentations illustrated that the conventional image compressing apparatus could be constructed using the developed LSI chip set.

Also, NIPPON TELEGRAPH AND TELEPHONE presented another image compressing apparatus in conformity with H. 261 using DSP for image compression in the above Transactions (pp. 207–220) and in NTT R&D (No. 8, pp. 1025–1042, 1991). The image compressing apparatus also falls within the field of the conventional image compressing apparatus.

Further, Japanese Patent Application Laying Open (KOKAI) No. 4-196681 describes a quantization circuit which executes no division if a quantizing result or quantization parameter is 1. An image compressing apparatus using this circuit can simplify merely a part of the operation in the quantization unit.

The conventional image compressing apparatus activates the orthogonal transform unit, the quantization unit and the variable length coding unit for all blocks irrespective of the characteristics of predictive error. Accordingly, such circuits were activated to operate even for a block which has predictive errors small enough to give advance knowledge that all quantizing results are to be 0, which caused an increase in dissipation power of the apparatus and an increase in processing time.

SUMMARY OF THE INVENTION

It is an object of the present invention to provide an image compressing apparatus which is low in dissipation power and short in processing time.

The object of the present invention can be achieved by an image compressing apparatus for compressing an image in a unit of a macroblock composed of a plurality of blocks including image information comprising:

a predictive coding unit for obtaining a predictive error between each image signal and each predictive signal for each block and obtaining a predictive error sum for each macroblock, which is an absolute value sum of the obtained predictive errors;

an orthogonal transform unit for effecting an orthogonal transform on each predictive error obtained by the predictive coding unit to produce and output an orthogonal transform signal;

a coding control unit for supplying a quantization parameter;

a quantization unit for quantizing each orthogonal transform signal output from the orthogonal transform unit using the supplied quantization parameter to produce and output a quantizing signal;

a variable length coding unit for effecting variable length coding on each output quantizing signal to produce and output a compressed signal; and a start decision unit for providing a start control signal for controlling operations of the orthogonal transform unit, quantization unit and variable length coding unit.

In an embodiment of the image compressing apparatus, the start decision unit produces a start control signal from the predictive errors for each block and the quantization parameter. In another embodiment of the image compressing apparatus, the start decision unit produces a start control signal from the predictive error sum for each macroblock and the quantization parameter.

In an embodiment of the image compressing apparatus, the start decision unit sets the start control signal to a logic value 1 if a predictive error sum for each block or macroblock is at least equal to a predetermined value and to a logic value 0 if the predictive error sum is less than the predetermined value. Also, the orthogonal transform unit, quantization unit and variable length coding unit are activated to operate only if they receive the logic value 1 and are not activated to operate if they receive the logic value 0.

In an embodiment of the image compressing apparatus, the start decision unit comprises a predictive error sum calculating circuit for calculating a predictive error sum for each block, a threshold table for defining a threshold value for each quantization parameter, and a comparator for comparing a predictive error sum obtained by the predictive error sum calculating circuit with a threshold value corresponding to a quantization parameter as obtained from the threshold table to supply a start control signal based on the comparison result. In this embodiment, the comparator outputs the start control signal of a logic value 1 if the predictive error sum for each block is at least equal to the threshold value, and outputs the start control signal of a logic value 0 if the predictive error sum for each block is less than the threshold value. In this embodiment, the predictive error sum calculating circuit comprises an adder and a register, which adds predictive errors input thereinto in order and calculates a predictive error sum for each block.

In the above embodiment, the threshold table may include threshold values T determined for quantization parameters Q by the following equations:

$T=8Q$, when Q is an odd value;

$T=8Q-4$, when Q is an even value.

Further, in the above embodiment, the threshold table may include threshold values T determined for quantization parameters Q by the following equations:

$T=8Q+4$, when Q is an odd value;

$T=8Q$, when Q is an even value.

In another embodiment of the image compressing apparatus, the start decision unit comprises a threshold table defining a threshold value for each quantization parameter, and a comparator for comparing a predictive error sum for each macroblock from the predictive coding unit with a quantization parameter obtained from the threshold table to supply a start control signal based on the comparison result. In this embodiment, the threshold table may include threshold values T determined for quantization parameters Q by the following equations:

$T=8Q$, when Q is an odd value;

$T=8Q-4$, when Q is an even value.

Further, in this embodiment, the threshold table may include threshold values T determined for quantization parameters Q by the following equations:

$T=32Q$, when Q is an odd value;

$T=32Q-16$, when Q is an even value.

In the image compressing apparatus according to the present invention, the orthogonal transform may be the discrete cosine transform, the Hadamard transform or the Karhunen-Loeve (K-L) transform.

In another embodiment of the image compressing apparatus, the apparatus further comprises restoring means for obtaining a restored image signal, wherein the restoring means is also controlled by the start control signal from the start decision unit. The restoring means comprises an inverse quantization unit for inverse-quantizing each quantizing signal, an inverse orthogonal transform unit for effecting an inverse orthogonal transform on each inverse-quantizing signal, and an adder for adding an inverse orthogonal transform signal and a predictive error to obtain a restored image signal.

In the image compressing apparatus of the present invention, the start decision unit receives the predictive errors for each block or the predictive error sum for each macroblock from the predictive coding unit and the quantization parameter from the coding control unit to produce a start control signal. The start control signal is set to a logic value 1 if the orthogonal transform unit, the quantization unit and the variable length coding unit are to be activated. The start control signal is set to a logic value 0 if they are not to be activated. The orthogonal transform unit, the quantization unit and the variable length coding unit are activated with the start control signal of a logic value 1 to perform respective processes, and are kept unactivated with the start control signal of a logic value 0.

The image compressing apparatus of the present invention is provided with the start decision unit for producing the start control signal, in which the orthogonal transform unit, the control unit and the variable length coding unit are activated to operate only when they are instructed to operate by the start control signal. Thus, the apparatus performs no wasted operation and has advantages of lower power dissipation and reduced processing time as compared with the conventional image compressing apparatus.

Further objects and advantages of the present invention will be apparent from the following description of the preferred embodiments of the invention as illustrated in the accompanying drawings.

BRIEF DESCRIPTION OF THE DRAWINGS

FIGS. 2a to 2c are drawings to show a macroblock, in which FIG. 2a shows four blocks indicating a luminance signal Y, FIG. 2b shows a block indicating a chrominance signal $C_B$, and FIG. 2c shows a block indicating a chrominance signal $C_R$;

FIG. 3 is a diagram to show the internal structure of a predictive coding unit;

FIG. 6 is a drawing to show a first example of threshold table in the first embodiment;

FIG. 7 is a drawing to show a second example of threshold table in the first embodiment;

FIG. 10 is a drawing to show a first example of threshold table in the second embodiment;

FIG. 11 is a drawing to show a second example of threshold table in the second embodiment;

DESCRIPTION OF THE PREFERRED EMBODIMENTS

The embodiments of image compressing apparatus according to the present invention will be described in detail with reference to the accompanying drawings.

Figure 1:
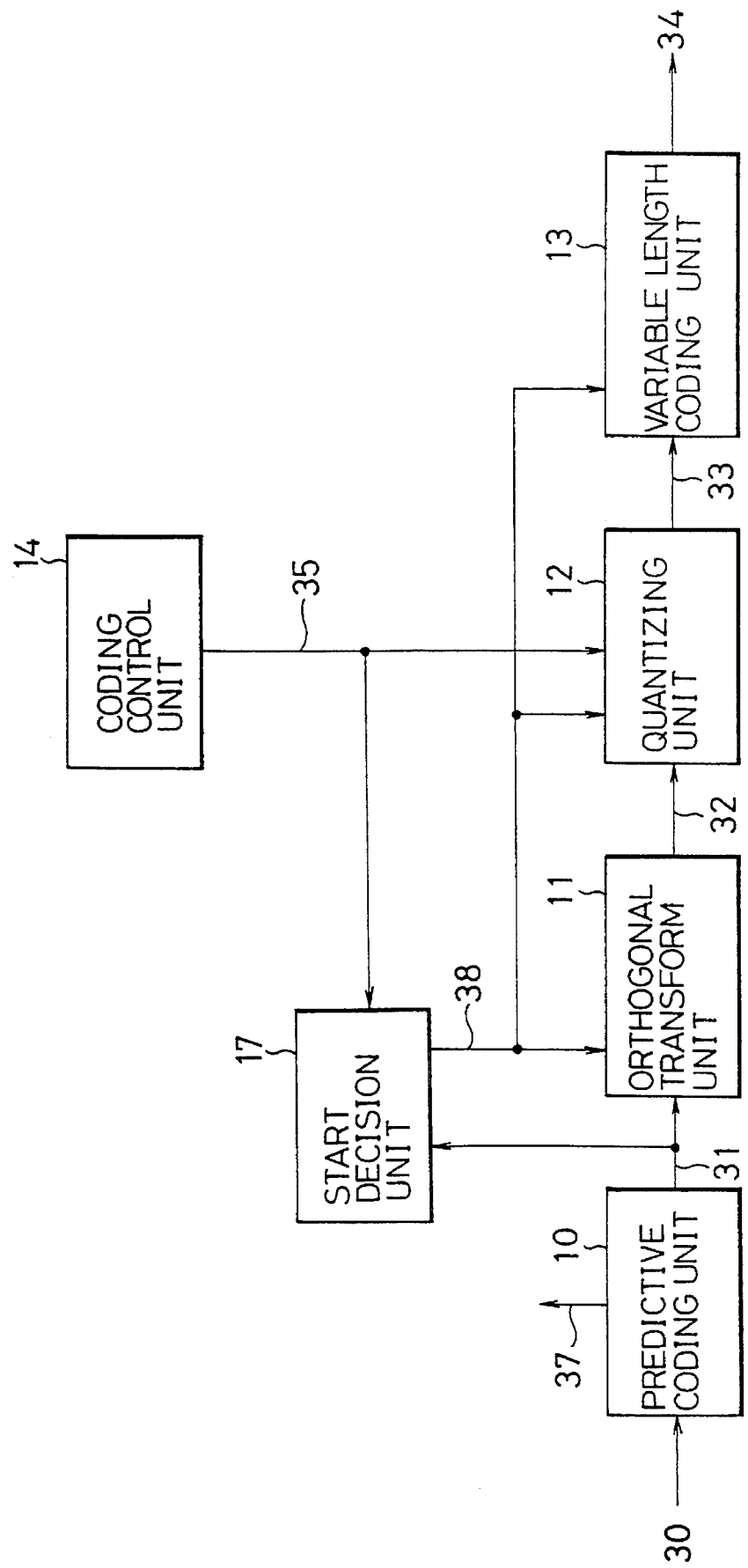
FIG. 1 is a schematic diagram to show a first embodiment of image compressing apparatus according to the present invention.
Figure 2A:
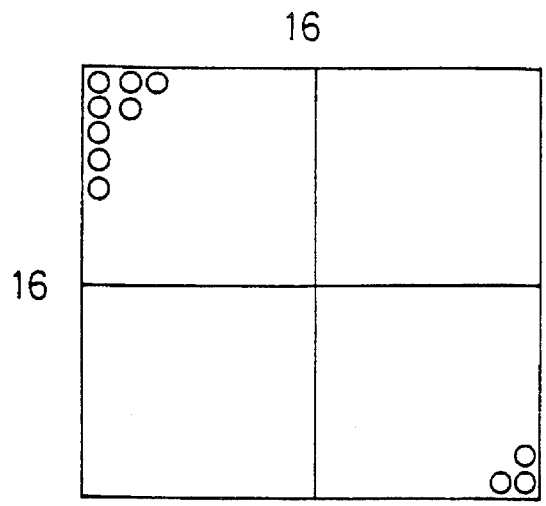
Figure 2B:
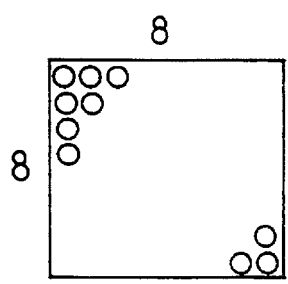
Figure 2C:
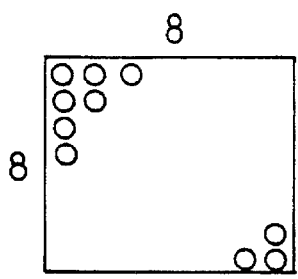

FIG. 1 is a schematic diagram to show the first embodiment of image compressing apparatus according to the present invention. The image compressing apparatus in FIG. 1 is composed of a predictive coding unit 10 for producing predictive errors 31 for each block and a predictive error sum 37 for each macroblock; an orthogonal transform unit 11 for effecting an orthogonal transform on each predictive error 31 to produce an orthogonal transform result 32; a quantization unit 12 for quantizing each orthogonal transform result 32 to produce a quantizing result 33; a variable length coding unit 13 for variable-length-coding each quantizing result 33; a coding control unit 14 for producing a quantization parameter 35; and a start decision unit 17 for producing a start control signal 38. The macroblock and the blocks constituting it are the same as those as described above with FIGS. 2a to 2c. The image compressing procedure in the image compressing apparatus in FIG. 1 is as follows.

(1) Predictive Coding

The predictive coding unit 10 carries out the interframe predictive coding with motion detection for video input signals 30 to obtain the predictive errors 31. FIG. 3 is a drawing to show the internal structure of the predictive coding unit 10 for performing the interframe predictive coding with motion detection. The predictive coding unit 10 is composed of a motion detecting circuit 15 and a subtracter 18, as shown in FIG. 3. In FIG. 3, the motion detecting circuit 15 performs the calculation of Equation 1 for each macroblock with input of video input signals 30 and outputs predictive signals 36 of A'i+u, j+v which minimize error e(u,v).

$$e(u,v) = \sum_{lumi.\ sig.} \sum_{i=0}^{7} \sum_{j=0}^{7} |A_{ij} - A'_{i+u, j+v}| \quad (Eq\ 1)$$

In Equation 1, A'ij represents video input signals of a previous frame and the outermost $\Sigma$, a summation for four blocks of luminance signals.

Further, the subtracter 16 calculates a difference between a video input signal 30 and a predictive signal 36 to obtain a predictive error 31 for each block as defined by Equation 2.

(Equation 2) $B_{ij} = A_{ij} - A'_{i+u', j+v'}$ ($i,j = 0, 1, \ldots, 7$)

As seen from the above procedure, when the interframe predictive coding with motion detection is carried out, an absolute value sum Emb 37 of predictive errors for each macroblock (hereinafter referred to as a predictive error sum for each macroblock) as indicated in Equation 3 is also obtained at the same time.

(Equation 3)
$$Emb = \min_{u,v} \{e(u,v)\} =$$

$$\sum_{lumi.\ sig.} \sum_{i=0}^{7} \sum_{j=0}^{7} |B_{i,j}| =$$

$$\sum_{lumi.\ sig.} \sum_{i=0}^{7} \sum_{j=0}^{7} |A_{ij} - A'_{i+u', j+v'}|$$

(2) Orthogonal Transform

The orthogonal transform unit 11 effects the orthogonal transform on each predictive error 31 for each block to obtain an orthogonal transform result 32. The orthogonal transform is the DCT (Discrete Cosine Transform) as defined in Equation 4.

(Equation 4)

$$C_{ij} = 1/4 \times C_i C_j \sum_{s=0}^{7} \sum_{t=0}^{7} \{B_{st} \times \cos(2s+1)i\pi/16 \times$$

$$\cos(2t+1)j\pi/16\} \quad (i,j = 0, 1, \ldots, 7)$$

where $C_i$, $C_j = \cos\pi/4$, if $i,j = 0$
$= 1$, if $i,j \neq 0$ (3) Quantizing Process The quantization unit 12 effects the quantization process on each orthogonal transform result 32 for each block to obtain a quantizing result 33. The quantization process is a division of the each orthogonal transform result 32 by a quantization parameter 35 (Q) received from the coding control unit 14. For example, Equation 5 shows the quantization process for elements except for INTRA DC component in H. 261. In the division, a decimal part is discarded to make an absolute value smaller.

$$D_{ij} = C_{ij}/2Q \quad Q: odd; \quad (Equation\ 5)$$
$$= (C_{ij} + 1)/2Q \quad Q: even\ and\ C_{ij} \geq 0$$
$$= (C_{ij} - 1)/2Q \quad Q: even\ and\ C_{ij} < 0$$
$$(i,j = 0, 1, \ldots, 7)$$

(4) Variable Length Coding

The variable length coding unit 13 effects the variable length coding on the quantizing results 33 to obtain a compressed bit string 34. Many elements are 0 at the stage of the quantizing results 33 and therefore only non-zero elements are extracted to be variable-length-coded. The variable length coding is not carried out for a block with all elements being 0, because there exists no elements to be variable-length-coded.

The image compressing apparatus of the present invention is further provided with the start decision unit 17. The start decision unit 17 receives the predictive errors 81 from the predictive coding unit 10 and the quantization parameter 35 from the coding control unit 14 to produce a start control signal 88. The start control signal 88 is defined such that a logic value 1 is set if the orthogonal transform unit 11, the quantization unit 12 and the variable length coding unit 13 are to be started; or that a logic value 0 is set if they are not to be started. The orthogonal transform unit 11, the quantization unit 12 and the variable length coding unit 13 are activated to operate in accordance with the start control signal 38. In more detail, they are activated to operate when the start control signal 38 is the a logic value 1, performing the respective processes. On the other hand, they are not activated if the start control signal 38 is the a logic value 0.

Figure 4:
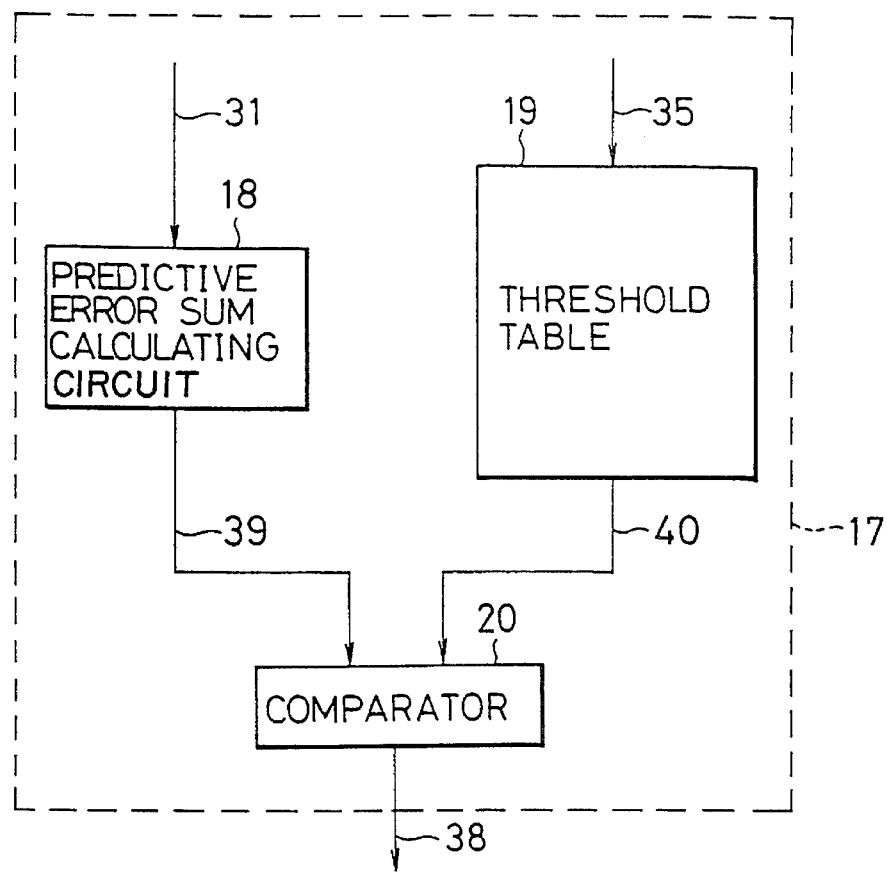
FIG. 4 is a diagram to show the internal structure of a start decision unit in the first embodiment.

FIG. 4 is a drawing to show the internal structure of the start decision unit 17. The start decision unit 17 is composed of a predictive error sum calculating circuit 18, a threshold table 19 and a comparator 20. In the start decision unit in FIG. 4, the predictive error sum calculating circuit 18 calculates a predictive error sum 39 for each block from predictive errors 31, and the threshold table 19 includes threshold values 40 corresponding to quantization parameters 35. The comparator 20 compares a predictive error sum 39 for each block from the predictive error sum calculating circuit 18 with a threshold value 40 obtained by looking up the threshold table 19 for a quantization parameter 85. The comparator 20 sets the start control signal 88 to the a logic value 1 if predictive error sum 39>threshold value 40. Also, the comparator 20 sets the start control signal 38 to the a logic value 0 if predictive error sum 39<threshold value 40.

Figure 5:
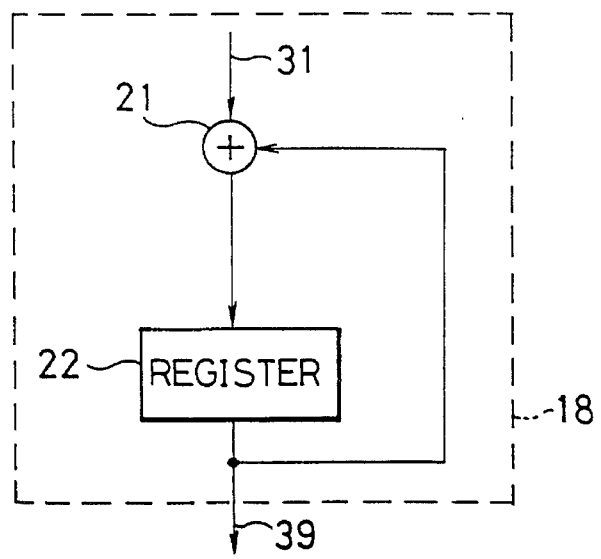
FIG. 5 is a diagram to show the internal structure of a predictive error sum calculating circuit.

FIG. 5 is a drawing to show the internal structure of the predictive error sum calculating circuit 18. The predictive error sum calculating circuit 18 in FIG. 5 is composed of an adder 21 and a register 22, which adds predictive errors 31 input thereinto in order to obtain a predictive error sum 39 for each block as indicated in Equation 6.

$$Eb = \sum_{i=0}^{7} \sum_{j=0}^{7} |Bij| \qquad \text{(Equation 6)}$$

FIG. 6 and FIG. 7 show two examples of the threshold table 19, which may be used in image compressing apparatus in conformity with H. 261. In the first example as shown in FIG. 6, a threshold value T is determined for a quantization parameter Q by Equation 7.

(Equation 7) T=8Q Q: odd

T=8Q−4 Q: even

The thus set threshold table guarantees by the following proof that all quantizing results for a block are 0 if the predictive error sum for the block is less than the threshold value.

(Proof) Let $Q$ be odd. if $Eb = \Sigma\Sigma|Bij| < 8Q$, from Equation 4
$|Cij| \leq |1/4 \times CiCj\Sigma\Sigma|Bst| \times \cos(2s + 1)i\pi/16 \times \cos(2t + 1)j\pi/16|$
$\leq 1/4 \times CiCj\Sigma\Sigma|Bst|$
$< 1/4 \times CiCj \times 8Q$
$\leq 2Q$ Since the decimal part in division is discarded to make the absolute value smaller, from Equation 5, $$Dij = Cij/2Q = 0$$

The above is also true when Q is even. (Q.E.D.) Accordingly, it is assured that this arrangement can provide the same compressed bit string as one obtained in the conventional image compressing apparatus, even if the orthogonal transform unit, the quantization unit and the variable length coding unit are not activated.

Also, FIG. 7 shows a second example of the threshold table 19. In the second example in FIG. 7, threshold values T in the threshold table are set to values larger than those in the first example in FIG. 6. In this arrangement, with a block having a certain small predictive error sum, it is assumed that the block has all quantizing results being 0, and the successive processes are not conducted for the block.

In the second example in FIG. 7, the threshold values T are determined for quantization parameters Q by Equation 8.

(Equation 8) T=8Q+4 Q: odd

T=8Q Q: even

Figure 8:
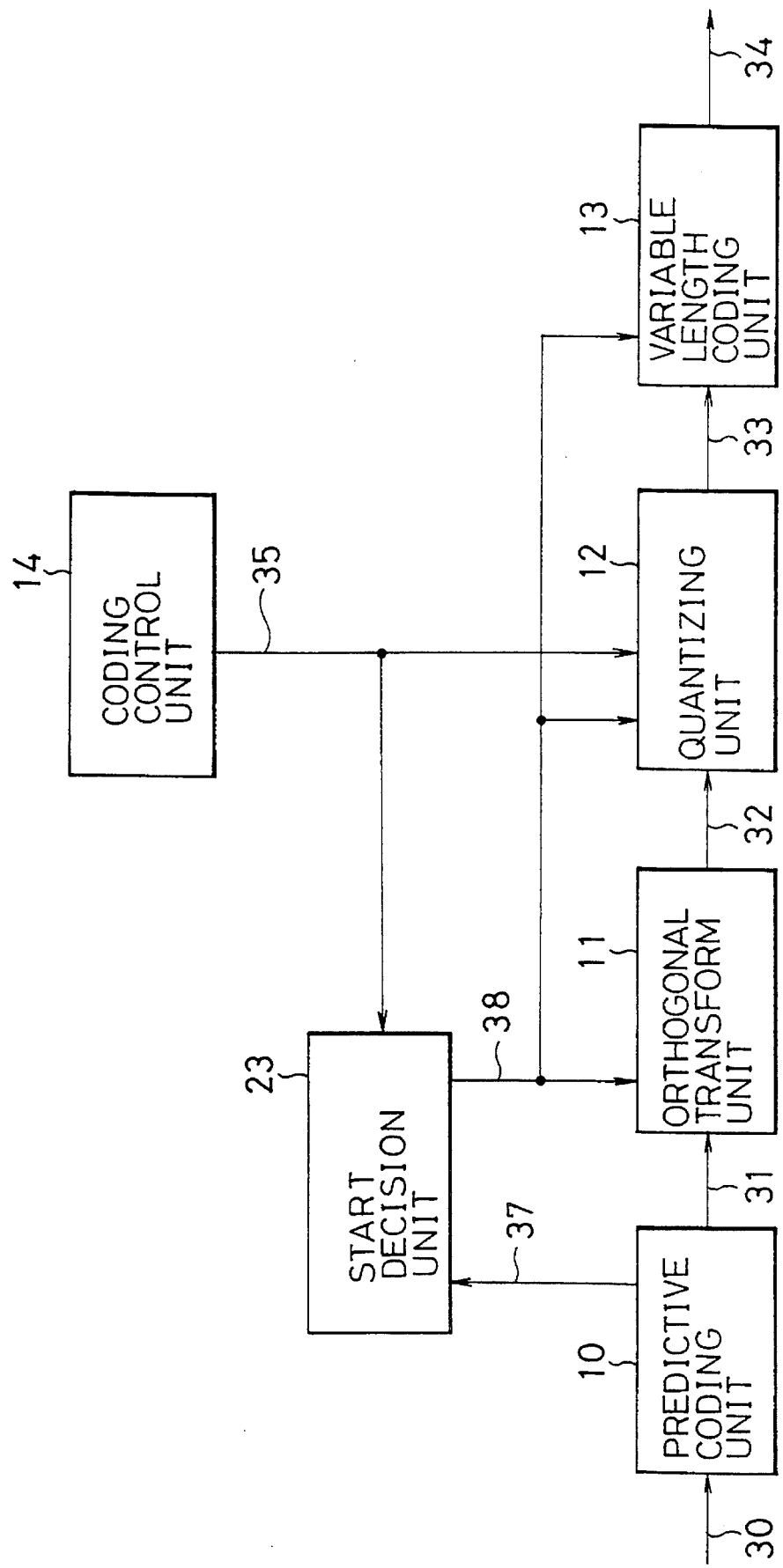
FIG. 8 is a schematic drawing to show a second embodiment of image compressing apparatus according to the present invention.

FIG. 8 is a schematic diagram to show the second embodiment of image compressing apparatus according to the present invention. The image compressing apparatus in FIG. 8 is composed, similar to the first embodiment, of a predictive coding unit 10 for producing predictive errors 31 for each block and a predictive error sum 37 for each macroblock, an orthogonal transform unit 11 for effecting the orthogonal transform on each predictive error 31 to produce an orthogonal transform result 32, a quantization unit 12 for quantizing each orthogonal transform result 32 to produce a quantizing result 33, a variable length coding unit 13 for variable-length-coding each quantizing result 33, a coding control unit 14 for producing a quantization parameter 35, and a start decision unit 23 for producing a start control signal 38. The start decision unit 23 is different in function as follows from the start decision unit 17 in the first embodiment.

The start decision unit 28 receives a predictive error sum 37 for each macroblock from the predictive coding unit 10 and a quantization parameter 85 from the coding control unit 14 to produce a start control signal 38. The meaning of the start control signal 38 and the operations of orthogonal transform unit 11, quantization unit 12 and variable length coding 13 are the same as those of the first embodiment.

Figure 9:
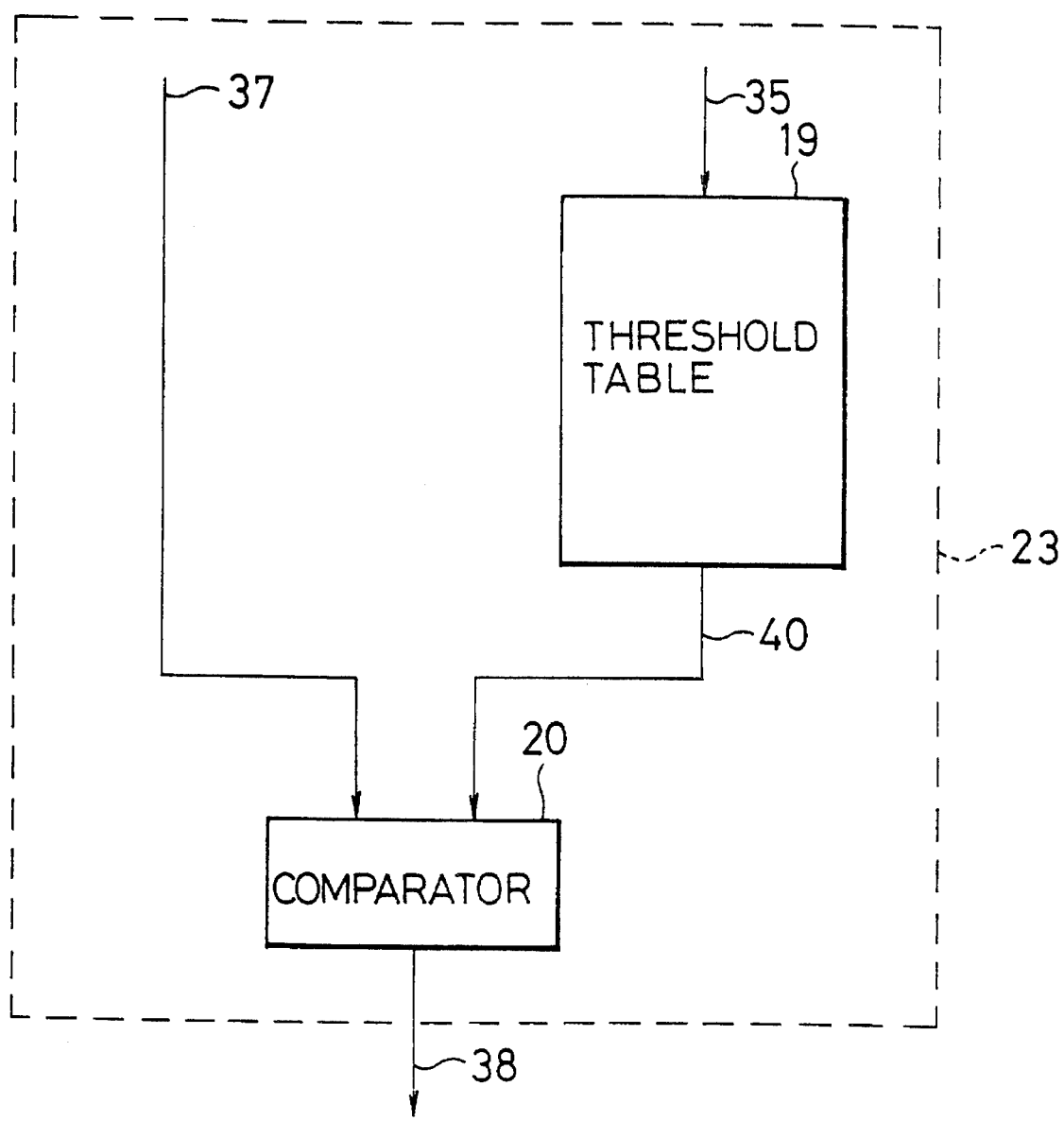
FIG. 9 is a drawing to show the internal structure of a start decision unit in the second embodiment.

FIG. 9 is a drawing to show the internal structure of the start decision unit 23. The start decision unit 23 is composed of a threshold table 19 and a comparator 20. In the start decision unit in FIG. 9, the comparator 20 compares a predictive error sum 37 for each macroblock with a threshold value 40 obtained by looking up the threshold table 19 for a quantization parameter 35. The comparator 20 sets the start control signal 38 to the logic value 1 if predictive error sum 37>threshold value 40. The comparator 20 sets the start control signal 38 to the logic value 0 if predictive error sum 37<threshold value 40.

FIG. 10 and FIG. 11 show two examples of the threshold table 19. FIG. 10 shows a first example of threshold table 19, which is the same as that in FIG. 6. Namely, threshold values T are determined for quantization parameters Q in accordance with Equation 7. This arrangement guarantees by the same proof in the first embodiment that the same bit string as in the conventional image compressing apparatus can be obtained as long as the predictive error sum for each macroblock is less than the threshold value, even if the orthogonal transform unit, the quantization unit and the variable length coding unit are not activated to operate.

FIG. 11 shows a second example of threshold table 19, in which the threshold values T are four times larger than those in FIG. 10, taking into consideration that the predictive error sum 37 for each macroblock becomes about four times larger than a predictive error for each block on average. Namely, the threshold values T are determined for quantization parameters Q by Equation 9 in the second example.

(Equation 9) T=32Q Q: odd

T=32Q−16 Q: even

This arrangement could provide a bit string different from that obtained in the conventional image compressing apparatus depending upon a distribution of the predictive error sum, but has an advantage that the resultant compressed bit string is shorter than one obtained in the first example in FIG. 10.

In the second embodiment, the start decision unit 23 uses the predictive error sum 37 for each macroblock obtained in interframe predictive coding with motion detection in the predictive coding unit 10 to carry out a start decision for each macroblock. This permits the image compressing apparatus of the present invention to be achieved in a simpler arrangement than that of the first embodiment, by obviating the predictive error sum calculating circuit 18.

Although the above embodiments employ the DCT (discrete cosine transform) as the orthogonal transform, the orthogonal transform may be the Hadareard transform or the Karhunen-Loeve (K-L) transform, which can provide a similar image compressing apparatus.

Since each of the image compressing apparatuses according to the present invention as described above is so arranged that the orthogonal transform unit, the quantization unit and the variable length coding unit are not activated for a block having so sufficiently small predictive errors to indicate that all quantizing results will be 0, no wasted operation is conducted. This reduces the power dissipation and the processing time of the apparatus as compared with the conventional image compressing apparatus. This effect is especially great for an apparatus performing low-bit-rate coding in which the quantization parameter becomes larger for moving images including a lot of stationary portions, such as video phone or video conference systems.

Figure 12:
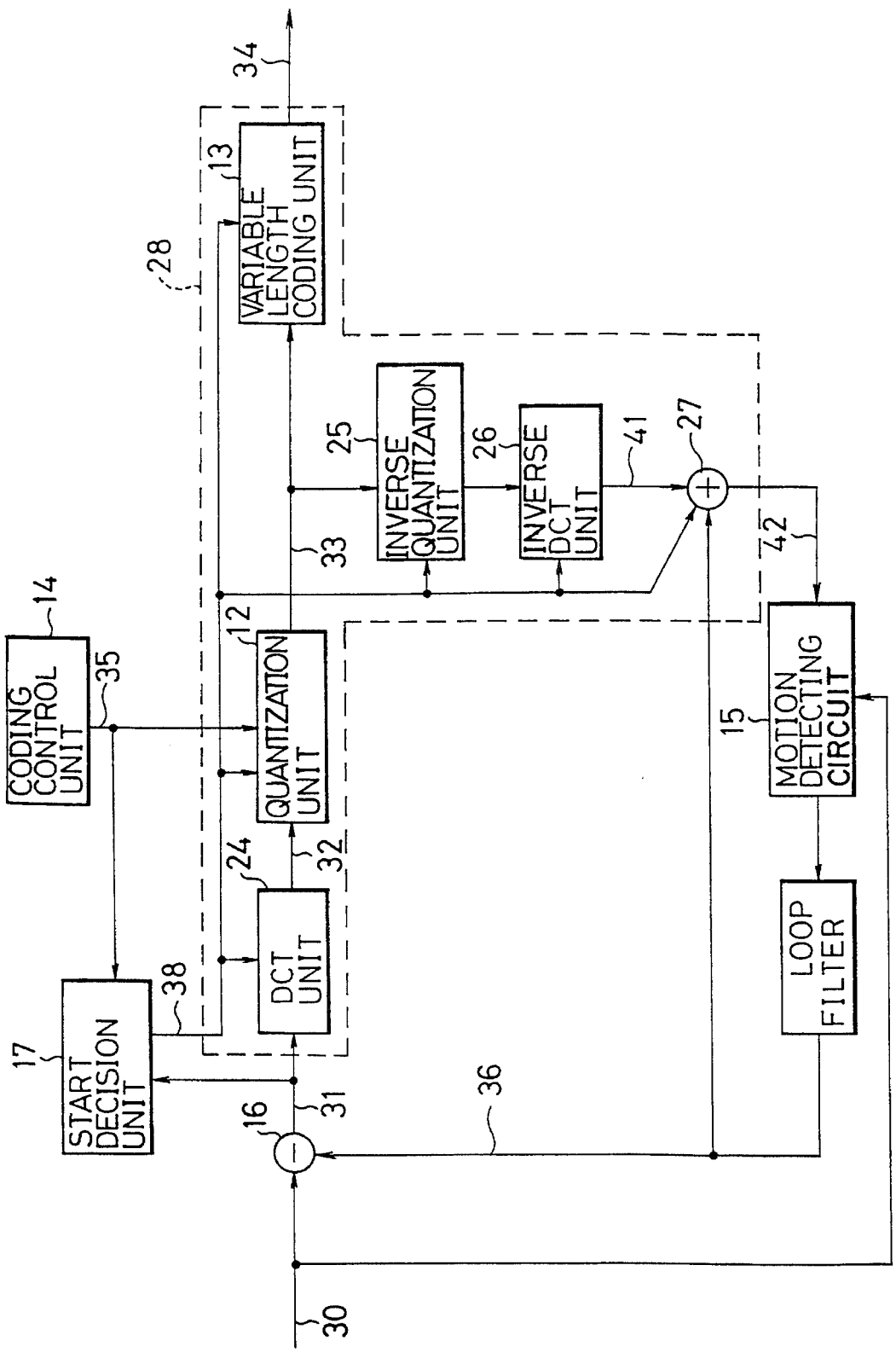
FIG. 12 is a schematic diagram to show a third embodiment of an image compressing apparatus according to the present invention in conformity with H. 261.
Figure 13:
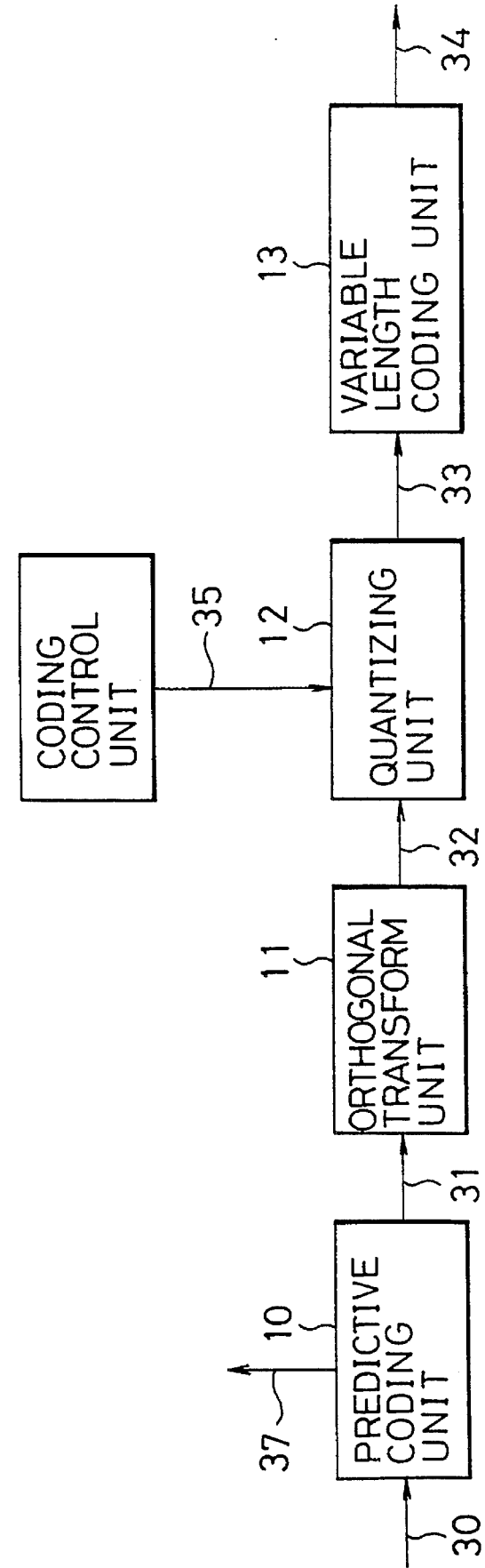
FIG. 13 is a schematic diagram to show a conventional image compressing apparatus.

Also, the image compressing apparatus according to the present invention may have another advantage in that a section for restoration of image may be kept unactivated, in addition to the above advantage that the orthogonal transform unit, the quantization unit and the variable length coding unit may be kept unactivated. FIG. 12 shows the third embodiment of an image compressing apparatus according to the present invention in conformity with H. 261, which has such advantages. In FIG. 12, the image compressing apparatus has a motion detecting circuit 15, a subtracter 16, a DCT unit 24, a quantization unit 12, a variable length coding unit 13, a coding control unit 14 and a start control unit 17, which are for obtaining a compressed bit string 34 from video input signals 30. The procedure for obtaining the compressed bit string 34 is the same as in the image compressing apparatus shown in FIG. 1 and FIG. 3. Since H. 261 employs the DCT as the orthogonal transform, the DCT unit 24 in FIG. 12 corresponds to the orthogonal transform unit 11 in FIG. 1. While the above arrangement obtains the compressed bit string 34, an inverse quantization unit 25 and an inverse DCT unit 26 effect inversion of quantization and inversion of DCT, respectively, on each quantizing result 23 to obtain an inverse DCT result 41. An adder 27 adds an inverse DCT result 41 and a predictive error 36 to produce a restored image signal 42. The restored image signals 42 are stored in a motion detecting circuit 15 for use in processing for a next frame. In the image compressing apparatus in the present embodiment, the start decision unit 17 supplies a start decision signal 38 to the inverse quantization unit 25, to the inverse DCT unit 28 and to the adder 27, as well as to the DCT unit 24, to the quantization unit 12 and to the variable length coding unit 13. Then, start is also controlled for the portion included in the region 28 surrounded by the broken line in FIG. 12. As described above, the present embodiment permits many parts for the image compressing procedure in conformity with H. 261 to be controlled in start, which can eliminate waste operations and reduce the power dissipation of the apparatus.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image compressing apparatus for compressing an image in a unit of a macroblock composed of a plurality of blocks including image information, comprising:
    a predictive coding unit for obtaining a predictive error between each input image signal and each predictive signal for each block and obtaining a predictive error sum for each macroblock, which is an absolute value sum of the obtained predictive errors;
    an orthogonal transform unit for effecting an orthogonal transform on each predictive error obtained by said predictive coding unit to produce and output an orthogonal transform signal;
    a coding control unit for supplying a quantization parameter;
    a quantization unit for quantizing each orthogonal transform signal output from said orthogonal transform unit using said supplied quantization parameter to produce and output a quantizing signal;
    a variable length coding unit for effecting variable length coding on each output quantizing signal to produce and output a compressed signal; and
    a start decision unit for providing a start control signal for controlling operations of said orthogonal transform unit, quantization unit and variable length coding unit, wherein said start decision unit produces said start control signal from said predictive errors for each block and said supplied quantization parameter.

2. An image compressing apparatus according to claim 1, wherein said start decision unit includes a predictive error sum calculating circuit for calculating a predictive error sum for each block, a threshold table for defining a threshold value for each quantization parameter, and a comparator for comparing the predictive error sum obtained by said predictive error sum calculating circuit with a threshold value corresponding to a quantization parameter as obtained from the threshold table to supply the start control signal based on the comparison result.

3. An image compressing apparatus according to claim 2, wherein said comparator outputs said start control signal of a logic value 1 if said predictive error sum for each block is at least equal to said threshold value, and output said start control signal of a logic value 0 if said predictive error sum for each block is less than said threshold value.

4. An image compressing apparatus according to claim 2, wherein said predictive error sum calculating circuit includes an adder and a register, for adding predictive errors input thereinto in order of input and calculating the predictive error sum for each block.

5. An image compressing apparatus according to claim 2, wherein said threshold table includes threshold values T determined for quantization parameters Q by the following equations:

T=8Q, when Q is an odd value;

T=8Q−4, when Q is an even value.

6. An image compressing apparatus according to claim 2, wherein said threshold table includes threshold values T determined for quantization parameters Q by the following equations:

T=8Q+4, when Q is an odd value;

T=8Q, when Q is an even value.

7. An image compressing apparatus for compressing an image in a unit of a macroblock composed of a plurality of blocks including image information, comprising;
    a predictive coding unit for obtaining a predictive error between each input image signal and each predictive signal for each block and obtaining a predictive error sum for each macroblock, which is an absolute value sum of the obtained predictive errors;
    an orthogonal transform unit for effecting an orthogonal transform on each predictive error obtained by said predictive coding unit to produce and output an orthogonal transform signal;
    a coding control unit for supplying a quantization parameter;
    a quantization unit for quantizing each orthogonal transform signal output from said orthogonal transform unit using said supplied quantization parameter to produce and output a quantizing signal;
    a variable length coding unit for effecting variable length coding on each quantizing signal to output a compressed signal; and a start decision unit for providing a start control signal for controlling operations of said orthogonal transform unit, quantization unit and variable length coding unit, wherein said start decision unit produces said start control signal from said predictive error sum for each macroblock and said supplied quantization parameter.

8. An image compressing apparatus according to claim 7, wherein said start decision unit includes, a threshold table defining a threshold value for each quantization parameter, and a comparator for comparing a predictive error sum for each macroblock from the predictive coding unit with a quantization parameter obtained from the threshold table to provide a start control signal based on the comparison result.

9. An image compressing apparatus according to claim 8, wherein said threshold table includes threshold values T determined for quantization parameters Q by the following equations:

$T=8Q$, when Q is an odd value;

$T=8Q-4$, when Q is an even value.

10. An image compressing apparatus according to claim 8, wherein said threshold table includes threshold values T determined for quantization parameters Q by the following equations:

$T=32Q$, when Q is an odd value;

$T=32Q-16$, when Q is an even value.

11. An image compressing apparatus for compressing an image in a unit of a macroblock composed of a plurality of blocks including image information, comprising;

a predictive coding unit for obtaining a predictive error between each input image signal and each predictive signal for each block and obtaining a predictive error sum for each macroblock, which is an absolute value sum of the obtained predictive errors;

an orthogonal transform unit for effecting an orthogonal transform on each predictive error obtained by said predictive coding unit to produce and output an orthogonal transform signal;

a coding control unit for supplying a quantization parameter;

a quantization unit for quantizing each orthogonal transform signal output from said orthogonal transform unit using said supplied quantization parameter to produce and output a quantizing signal;

a variable length coding unit for effecting variable length coding on each quantizing signal to output a compressed signal; and a start decision unit for providing a start control signal for controlling operations of said orthogonal transform unit, quantization unit and variable length coding unit, wherein said start decision unit sets said start control signal to a logic value 1 if said predictive error sum for each block or macroblock is at least equal to a predetermined value and to a logic value 0 if said predictive error sum is less than the predetermined value and wherein said orthogonal transform unit, quantization unit and variable length coding unit are activated to operate only if they receive the logic value 1 and are not activated to operate if they receive the logic value 0.

12. An image compressing apparatus for compressing an image in a unit of a macroblock composed of a plurality of blocks including image information, comprising;

a predictive coding unit for obtaining a predictive error between each input image signal and each predictive signal for each block and obtaining a predictive error sum for each macroblock, which is an absolute value sum of the obtained predictive errors;

an orthogonal transform unit for effecting an orthogonal transform on each predictive error obtained by said predictive coding unit to produce and output an orthogonal transform signal;

a coding control unit for supplying a quantization parameter;

a quantization unit for quantizing each orthogonal transform signal output from said orthogonal transform unit using said supplied quantization parameter to produce and output a quantizing signal;

a variable length coding unit for effecting variable length coding on each quantizing signal to output a compressed signal; and a start decision unit for providing a start control signal for controlling operations of said orthogonal transform unit, quantization unit and variable length coding unit, and restoring means for obtaining restored image signal, wherein said restoring means is also controlled by said start control signal from said start decision unit.

13. An image compressing apparatus according to claim 12, wherein said restoring means comprises an inverse quantization unit for inverse-quantizing each quantizing signal, an inverse orthogonal transform unit for effecting an inverse orthogonal transform on each inverse-quantizing signal, and an adder for adding an inverse orthogonal transform signal and a predictive error to obtain a restored image signal.

* * * * *